(12) United States Patent
Ueno et al.

(10) Patent No.: US 6,465,907 B2
(45) Date of Patent: Oct. 15, 2002

(54) ACTIVATING DEVICE FOR VEHICLE PASSENGER PROTECTION SYSTEM

(75) Inventors: Yukiyasu Ueno, Nishio (JP); Mitsuhiko Masegi, Nukata-gun (JP)

(73) Assignee: Denso Corporation, Kariya (JP)

( * ) Notice: Subject to any disclaimer, the term of this patent is extended or adjusted under 35 U.S.C. 154(b) by 130 days.

(21) Appl. No.: 09/742,005

(22) Filed: Dec. 22, 2000

(65) Prior Publication Data

US 2001/0006309 A1 Jul. 5, 2001

(30) Foreign Application Priority Data

Dec. 24, 1999 (JP) .......................................... 11-366455
Mar. 13, 2000 (JP) ........................................ 2000-073965

(51) Int. Cl.[7] ................................................. B60L 1/00
(52) U.S. Cl. ........................... 307/10.1; 307/9.1; 701/45
(58) Field of Search .................... 307/9.1, 10.1; 701/45

(56) References Cited

U.S. PATENT DOCUMENTS 5,977,653 A    11/1999   Schmid et al.
6,072,246 A *  6/2000   Schafer ..................... 307/10.1
6,147,417 A    11/2000  Ueno

FOREIGN PATENT DOCUMENTS

| JP | 9-099801   | 4/1997 |
| JP | 10-100855  | 4/1998 |
| JP | 11-230987  | 8/1999 |

* cited by examiner

Primary Examiner—Brian Sircus
Assistant Examiner—Robert L Deberadinis
(74) Attorney, Agent, or Firm—Harness, Dickey & Pierce, PLC

(57) ABSTRACT

In an activating device for a passenger protection system in a vehicle, erroneous activating operation caused by improper operation of a microcomputer or electrical noise is prevented even though electronic switches are used to operate a squib. A microcomputer has output ports connected to first through third driving circuits controlling first through third electronic switching devices connected in series with a squib for deploying a passenger protection device. A timer circuit is connected to the first switching device by way of a prohibiting circuit provided as a hardware unit independent of the microcomputer.

13 Claims, 4 Drawing Sheets

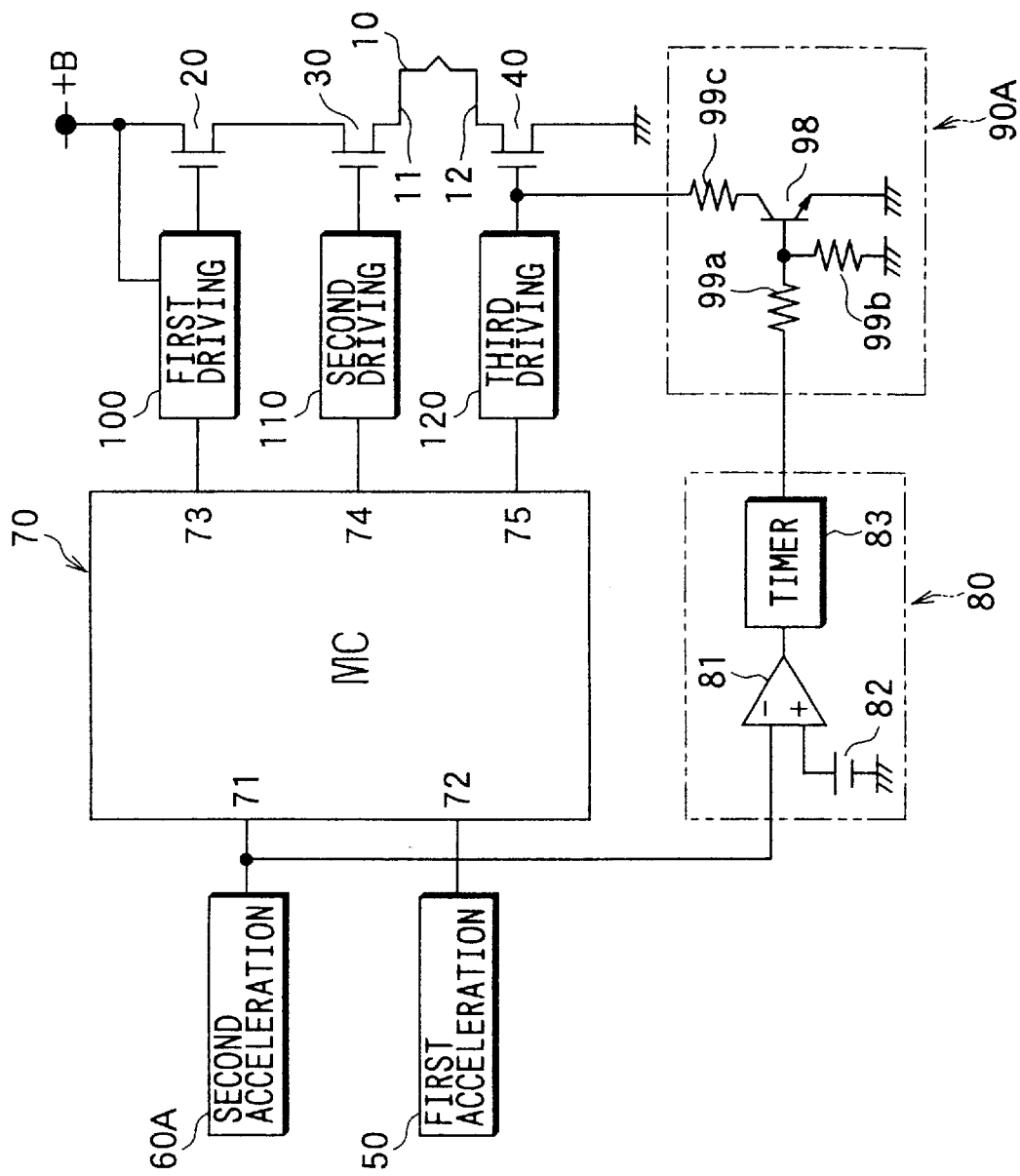

ACTIVATING DEVICE FOR VEHICLE PASSENGER PROTECTION SYSTEM

CROSS REFERENCE TO RELATED APPLICATION

This application is based on and incorporates herein by reference Japanese Patent Applications No. 11-366455 filed Dec. 24, 1999 and No. 2000-73965 filed Mar. 13, 2000.

BACKGROUND OF THE INVENTION

This invention relates to an activating device for a vehicle passenger protection system such as an air-bag system or a belt pretensioner installed in an automotive vehicle.

In an activating device of an air-bag system for use in a car, a mechanical switch has been employed as a switch for passing an activating current through a squib. This mechanical switch has been used in the activating device as a safety switch for operating the squib, because it is less likely to operate erroneously by electrical noise, improper operation of a microcomputer having as its main unit a CPU, or dewing or wetting.

However, the mechanical switch is expensive and large. Also, because the time for which the mechanical switch stays closed is short, it cannot provide the closure holding period needed for delay control used when a delay is to be provided between the operation of a belt pretensioner and the deployment of an air-bag or when a delay is to be provided between a first stage and a second stage of a two-stage deployment air-bag.

Consequently, in recent years, with the object of reducing cost and improving passenger protection performance, there has been an increasing need for the mechanical switch to be replaced with an electronic switching device. However, when replacing the mechanical switch with an electronic switching device, it is necessary to ensure that the electronic switching device will not operate erroneously as a result of electrical noise, improper operation of a microcomputer, or wetting.

SUMMARY OF THE INVENTION

It is therefore an object of the present invention to provide an activating device for a vehicle passenger protection system wherein erroneous activating operation caused by improper operation of a microcomputer or electrical noise is prevented even though electronic switches are used to operate a squib.

It is another object of the invention to provide an activating device for a vehicle passenger protection system wherein erroneous operation caused by dewing or wetting is prevented even when electronic switches are used to activate a squib.

According to the present invention, an activating device for a passenger protection device uses a pair of acceleration sensors and a plurality of electronic switching devices. The electronic switching devices are connected in series with a squib to allow an activating current to pass through the squib when turned on. A first circuit is provided to determine whether the vehicle is in a collision on the basis of detection outputs of the acceleration sensors. A second circuit is provided to determine whether the vehicle is in the collision on the basis of the detection output of one of the acceleration sensors. An ON-prohibiting circuit is provided to prohibit one of the electronic switching devices from being switched on when it is determined by one of the first and the second circuits that the vehicle is not in the collision. The ON-prohibiting circuit suspends this prohibition when it is determined by the one of the first and the second circuits that the vehicle is in the collision. The first circuit is a microcomputer provided as a hardware unit separately from the second circuit.

BRIEF DESCRIPTION OF THE DRAWINGS

The above and other objects, features and advantage of the present invention will become more apparent from the following detailed description made with reference to the accompanying drawings. In the drawings:

FIG. 4 is an electronic circuit diagram showing a second preferred embodiment of the present invention.

DETAILED DESCRIPTION OF THE PREFERRED EMBODIMENTS

Preferred embodiments of the invention will now be described in detail with reference to the drawings.

First Preferred Embodiment

Figure 1:
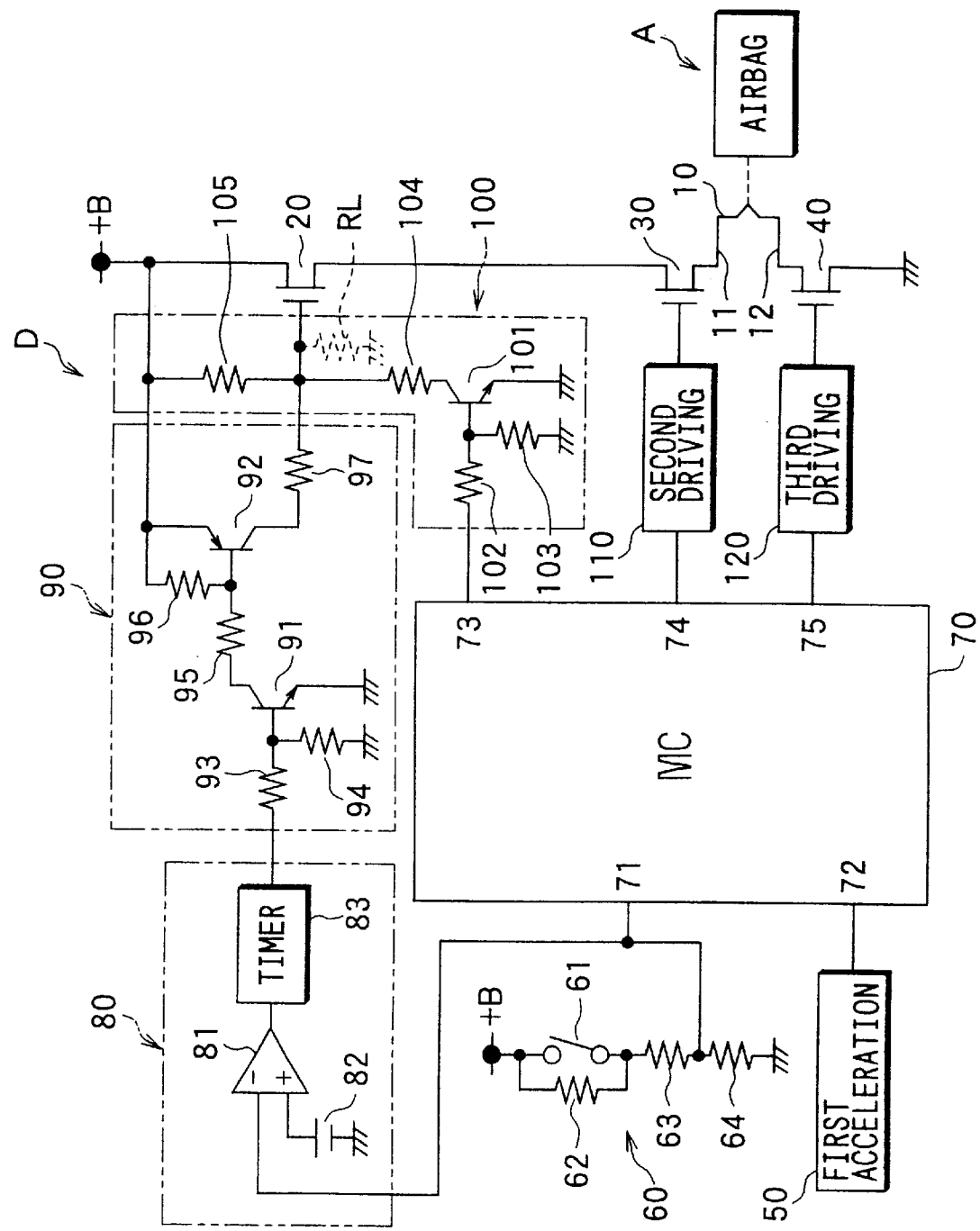
FIG. 1 is an electronic circuit diagram showing a first preferred embodiment of the present invention.
Figure 2:
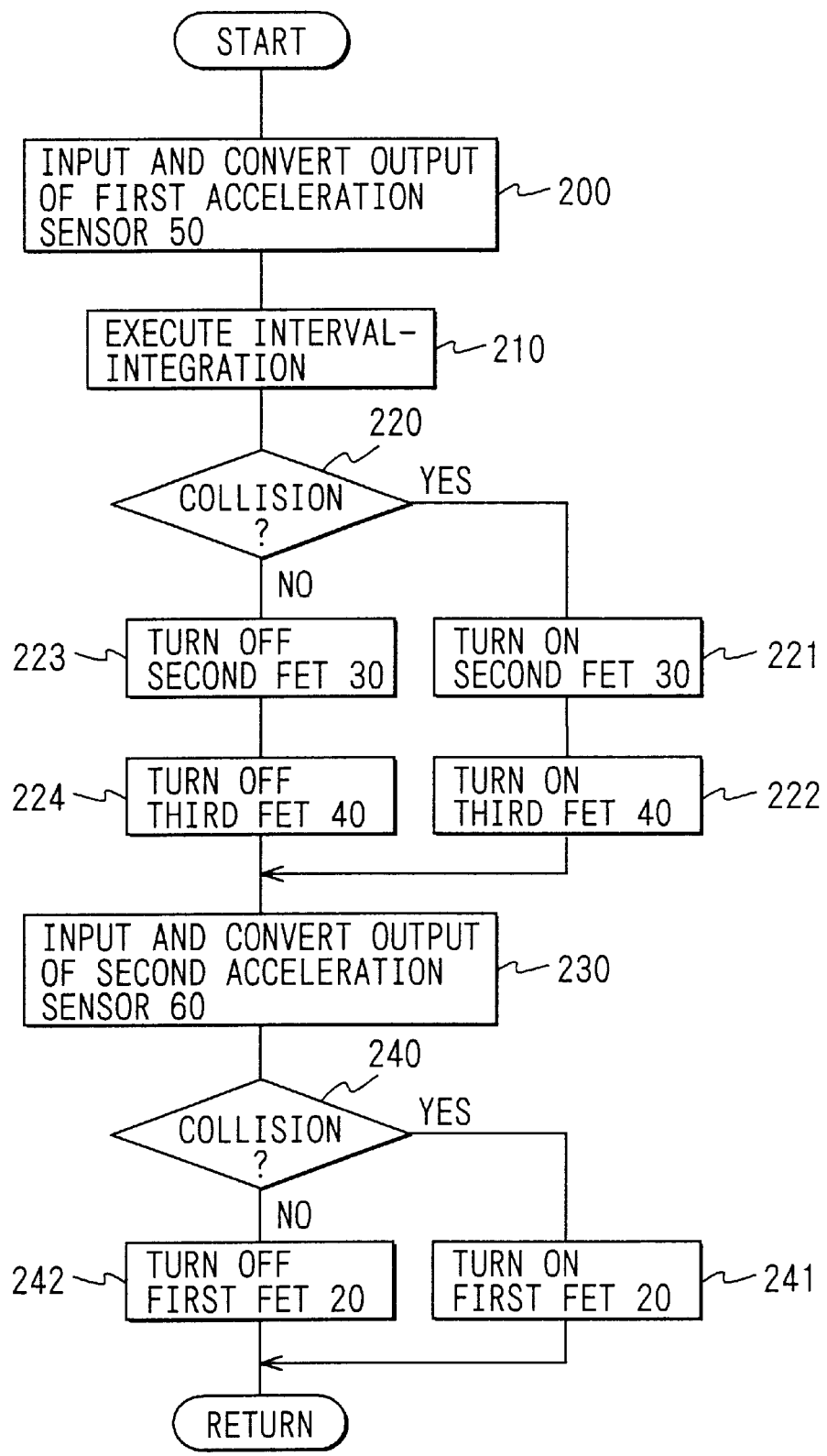
FIG. 2 is a flow chart showing the operation of a microcomputer used in the first embodiment.

Referring first to FIG. 1 and FIG. 2 showing a first embodiment, an air-bag system is made up of an air-bag device A mounted in the car and an activating device D. The air-bag device A is constructed to inflate an air-bag with gas from an inflator (not shown).

The activating device D has a squib 10 and first through third electronic switching devices 20, 30 and 40 connected in series with this squib 10. Here, the first and second electronic switching devices 20 and 30 are P-channel field effect transistors (FETs) and the third electronic switching device 40 is an N-channel field effect transistor (FET).

The switching device 20 has its source connected to the positive side terminal +B of a d.c. power supply. The switching device 30 has its source connected to the drain of the switching device 20, and the drain of this switching device 30 is connected to the positive side terminal 11 of the squib 10. The switching device 40 has its drain connected to the negative side terminal 12 of the squib 10, and the source of this switching device 40 is grounded.

The activating device D also has first and second acceleration (deceleration) sensors 50 and 60. The first acceleration sensor 50 is a semiconductor acceleration sensor, and this acceleration sensor 50 detects acceleration (deceleration) of the car and generates a detected acceleration signal proportional to the acceleration magnitude as an analog voltage. The output terminal of the first acceleration sensor 50 is connected to an input port 72 of a microcomputer (MC) 70.

The second acceleration sensor 60 has a normally-open mechanical switch 61 and resistors 62, 63 and 64. The mechanical switch 61 closes when it detects an acceleration accompanying a collision of the car. This mechanical switch 61 has a fixed contact connected to the positive side terminal +B of the d.c. power supply and a movable contact grounded by way of the resistors 63 and 64, which are connected in series. The resistor 62 is connected in parallel with the mechanical switch 61.

As a result, when the mechanical switch 61 is open, the voltage of the d.c. power supply is divided by the resistor 62 and the resistors 63 and 64, and the acceleration sensor 60 produces a divided voltage (output voltage Vc) from the common terminal of the resistors 63 and 64, which constitutes an output terminal. When the mechanical switch 61 is closed, the voltage of the d.c. power supply is divided by the resistors 63 and 64 only and the acceleration sensor 60 produces a different divided voltage (output voltage Va) from the same output terminal.

This means that the acceleration sensor 60 produces the output voltage Va as an "acceleration detection" voltage on the basis of the mechanical switch 61 closing at the time of a collision of the car. Accordingly, the division voltage Vc produced by the acceleration sensor 60 at other times corresponds to no "acceleration detection" voltage being produced. The common terminal of the resistors 63 and 64 is connected to an input port 71 of the microcomputer 70.

The activating device D further includes the microcomputer 70, a timer circuit 80, a prohibiting circuit 90, and first through third driving circuits 100, 110 and 120. The microcomputer 70 is made up of a CPU, ROM and other circuit devices. This microcomputer 70 is programmed to execute a computer program in accordance with the flow chart shown in FIG. 2, and in this execution, on the basis of the outputs of the acceleration sensors 50 and 60, performs processing necessary to drive the first through third driving circuits 100 through 120. Here, the microcomputer 70 activates to execute the computer program when supplied with power from a battery upon closing of an ignition switch (not shown) of the car. The computer program is pre-stored in the ROM of the microcomputer 70.

The first driving circuit 100 has a transistor 101 and a number of resistors 102 through 105. The transistor 101 has its base connected via the resistor 102 to an output port 73 of the microcomputer 70, and the collector of this transistor 101 is connected through the resistor 104 to the gate of the first switching device 20. The resistor 103 is connected between the base and the emitter of the transistor 101. The resistor 105 is connected at one end to the positive side terminal +B of the d.c. power supply, and the other end of this resistor 105 is connected through the resistor 104 to the collector of the transistor 101.

In this first driving circuit 100, the transistor 101 when switched on by the microcomputer 70 grounds the gate of the first switching device 20 by way of the resistor 104 and thereby switches on the first switching device 20. When switched off by the microcomputer 70, the transistor 101 disconnects the gate of the first switching device 20 from ground by way the resistor 104 and thereby switches off the first switching device 20.

Here, the transistor 101 turns on when it receives at its base via the resistors 102, 103 a high-level output signal from the output port 73 of the microcomputer 70, as will be further discussed later. The transistor 101 turns off when it receives at its base via the resistors 102, 103 a low-level output signal from the output port 73 of the microcomputer 70, as will be further discussed later.

The resistors 104, 105 perform the role of voltage-dividing resistors for determining the gate voltage of the first switching device 20 when a prohibition suspending signal is being produced by the prohibiting circuit 90, which will be further discussed later, and the transistor 101 is ON. On the basis of this gate voltage determination, the first switching device 20 is switched on when while the prohibition suspending signal is being produced by the prohibiting circuit 90 the transistor 101 turns on.

The second driving circuit 110 has an input terminal connected to an output port 74 of the microcomputer 70. The second driving circuit 110 drives the second switching device 30 to switch ON or OFF on the basis of control from the output port 74 of the microcomputer 70. The second driving circuit 110 has a similar construction to the first driving circuit 100.

The third driving circuit 120 has an input terminal connected to an output port 75 of the microcomputer 70. The third driving circuit 120 drives the third switching device 40 to switch ON or OFF on the basis of control from the output port 75 of the microcomputer 70. The third driving circuit 120 is comprised of a single resistor.

The timer circuit 80 functions as a determining circuit is comprised of hardware independent from the microcomputer 70. This timer circuit 80 is made up of a comparator 81, a reference voltage circuit 82 and a timer 83.

The comparator 81 produces a low-level comparison signal when the output voltage of the acceleration sensor 60 is higher than the reference voltage of the reference voltage circuit 82. When the output voltage of the acceleration sensor 60 is lower than the reference voltage of the reference voltage circuit 82, the comparison signal of the comparator 81 assumes a high level. Here, the reference voltage of the reference voltage circuit 82 is set to a value between the output voltage Va and the output voltage Vc of the acceleration sensor 60. Thus the comparison signal of the comparator 81 is low-level when the output of the acceleration sensor 60 is the voltage Va and is high-level when the output of the acceleration sensor 60 is the voltage Vc.

The timer 83 starts timing when the output of the comparison signal from the comparator 81 becomes low-level, and produces a low-level timer signal simultaneously with this start. This timer 83 functions to hold a low-level output, and the timing period of the timer 83 is set to a predetermined timing period (a low level holding period) of, for example, 10 ms.

This timing period is a period for ensuring that a suspension of a prohibition of closing of the first switching device 20 and an ON state of the first through third switching devices 20 through 40 overlap for a predetermined time (for example, 2 ms or more) at the time of a collision of the car as will be further discussed later. In this preferred embodiment, for example, NEC μPD5555 type timer IC is used as the timer 83.

The prohibiting circuit 90 is employed to prevent erroneous ON operation of the first switching device 20 caused by improper operation of circuit devices such as the CPU of the microcomputer 70 or by electrical noise, and also to prevent erroneous ON operation of the first switching device 20 caused by dewing or wetting of the activating device D.

The prohibiting circuit 90 is made up of two transistors 91, 92 and a plurality of resistors 93 through 97. The transistor 91 inputs at its base a timer signal from the timer 83 of the timer circuit 80 by way of the resistors 93, 94 and is kept OFF while the timer signal is at a low level. When output from the timer 83 is at a high level, the transistor 91 becomes ON.

The transistor 92 functions as a fourth electronic switching device in this preferred embodiment, and when the transistor 91 becomes ON, this transistor 92 is biased and turned on by the resistors 95, 96 and prohibits ON operation of the first switching device 20. When the transistor 91 becomes OFF, the transistor 92 turns off and thereby suspends the prohibition of ON operation of the first switching device 20.

Here, the resistor 97 has one terminal connected to the collector of the transistor 92 and the other terminal of this resistor 97 connected to the common terminal of the resistors 104, 105 of the first driving circuit 100 and to the gate of the first switching device 20.

Consequently, this resistor 97 determines the impedance between the gate and the source of the first switching device 20 when the transistor 92 is ON. As a result, if the value of the transistor 97 is amply smaller than the value of the resistor 105, this impedance becomes generally equal to the value of the resistor 97. If the value of the resistor 97 approaches 0 Ω, the first switching device 20 will not readily turn on erroneously as a result of dewing or wetting leakage.

For example, it will be supposed that a leak resistor RL due to dewing (FIG. 1) has arisen between the gate of the switching device 20 and ground. Because leak resistors due to water are generally from a few kΩ to 20 kΩ, it will be supposed that the leak resistor RL is 1 kΩ. As the first switching device 20, for example a field effect transistor which turns on when its gate voltage is 2V or more below the power supply voltage of the above-mentioned d.c. power supply (source voltage of the first switching device 20) is chosen. As the transistor 92 constituting the fourth switching device, a transistor whose maximum VCE (voltage across the collector and the emitter when the transistor is ON) is 0.3V is chosen. The above-mentioned power supply voltage will be taken to be 20V.

At this time, because the 2V of the above-mentioned ON condition of the switching device 20 is about one tenth of the 19.7V obtained by subtracting the VCE from the power supply voltage, the ratio of the resistor 97 to the leak resistor RL corresponding to the ON threshold of the first switching device 20 is in the vicinity of ¹⁄₁₀. If the value of the resistor 97 is set to 50 Ω to allow a margin of 50%, the first switching device 20 will not turn on even when the 1 kΩ leak resistor RL arises. Of course, the resistor 97 may alternatively be set to 0 Ω, i.e. the shorted state. In this case, the resistor 97 is dispensed with.

The reason for hypothesizing a leak to the ground side in this instance is that, because the pattern area, the number of lands and the number of via holes relating to ground on the printed circuit board on which the devices of the activating device D are mounted is overwhelmingly greater than the pattern area, the number of lands and the number of via holes relating to the power supply on the printed circuit board, leaks to ground are the more likely.

If as in an activating device of the related art the capability of the prohibiting circuit of reducing the above-mentioned impedance is not high, a leak resistor RL will cause the first switching device 20 to turn on erroneously. A resistor to leaks can alternatively be similarly realized by dispensing with the prohibiting circuit 90 and setting the value of the resistor 105 to a few tens of (Ω) to lower the above-mentioned impedance. However, this will not prevent the first switching device 20 from erroneously turning on as a result of improper operation of the microcomputer 70 or electrical noise. In this preferred embodiment, on the other hand, the first switching device 20 is prevented from turning on erroneously as a result of improper operation of the microcomputer 70, electrical noise or dewing or wetting.

With respect to another circuit constant, in consideration of the possibility of the transistor 101 erroneously becoming ON as a result of improper operation of the microcomputer 70 or electrical noise and turning on the first switching device 20, because the resistor 104 is equivalent to a leak resistor RL arising when a leak occurs, the value of the resistor 104 is preferably set to a value greater than the leak resistor RL (in this preferred embodiment, 1 kΩ).

Also, if a leak to ground occurs in parallel with the resistor 94, ON operation of the transistor 91 will be hindered and the prohibiting effectiveness of the prohibiting circuit 90 will be lost. Therefore, resistors 93, 94 with values such that ON operation of the transistor 91 is not hindered even when a 1 kΩ resistor is connected in parallel with the resistor 94 are preferably chosen.

If power supply lands or via holes are to exist in extreme proximity to the base of the transistor 92 serving as the fourth switching device or the collector of the transistor 91, which could lose function as a result of leakage to the d.c. power supply side, the values of the resistors 95 and 96 should be set with consideration given also to power supply side leakage.

In this first preferred embodiment, it will be assumed that the car assumes a travelling state when the ignition switch is closed. When the ignition switch is closed, the microcomputer 70 activates the execution of the computer program in accordance with the flow chart of FIG. 2.

Along with this activating, in a step 200, a detected acceleration signal from the first acceleration sensor 50 is inputted through the input port 72 to the microcomputer 70 and converted into digital data. Then, instep 210, this digital data is interval-integrated to obtain interval integration value. In step 220, a first collision determination for the car is made on the basis of this interval integration value.

Here, if the interval integration value is above a predetermined value, it is determined that the car is in a collision. ON processing for the second switching device (FET) 30 is carried out in step 221. The microcomputer 70 produces a high-level output signal from the output port 74. On the basis of the high-level output signal from the output port 74 of the microcomputer 70, the second driving circuit 110 turns on the second switching device (FET) 30.

Also, after the processing of step 221, ON processing for the third switching device (FET) 40 is carried out in step 222. The microcomputer 70 produces a high-level output signal from the output port 75. On the basis of the high-level output signal from the output port 75 of the microcomputer 70, the third driving circuit 120 turns on the third switching device (FET) 40.

When, on the other hand, in step 220 the interval integration value is less than the predetermined value, it is determined that the car is not in a collision. OFF processing for the second switching device (FET) 30 is carried out in step 223. The microcomputer 70 produces a low-level output signal from the output port 74. On the basis of the low-level output signal from the output port 74 of the microcomputer 70, the second driving circuit 110 turns off the second switching device (FET) 30.

Also, after the processing of step 223, OFF processing for the third switching device (FET) 40 is carried out in step 224. The microcomputer 70 produces a low-level output signal from the output port 75. On the basis of the low-level output signal from the output port 75 of the microcomputer 70, the third driving circuit 120 turns off the third switching device (FET) 40.

After the processing of step 222 is finished as described above, in step 230, the output of the second acceleration sensor 60 is inputted to the microcomputer 70 and converted to a digital value. Then, instep 240, second collision determination processing is carried out. Here, a collision determination reference value is set to a digital value equivalent to the reference voltage of the reference voltage circuit 82 of the timer circuit 80. If the output of the second acceleration sensor 60 is the output voltage Va, which is the "acceleration detection" voltage, it is determined that the car is in a collision. In step 241, ON processing for the first switching device (FET) 20 is carried out.

The microcomputer 70 then produces a high-level output signal from the output port 73. On the basis of the high-level output signal from the output port 73 of the microcomputer 70, the first driving circuit 100 turns on the transistor 101 in order to turn on the first switching device (FET) 20.

The same output of the second acceleration sensor 60 is also inputted to the timer circuit 80. Here, if the output of the second acceleration sensor 60 is the "acceleration detection" output voltage Va, the comparator 81 generates a low-level comparison signal. Accordingly, the timer 83 starts timing and simultaneously outputs a low-level timer signal. The timer 83 holds this output for the above-mentioned low level holding period and raises it to a high level when the low level holding period elapses.

Consequently, in the prohibiting circuit 90, for as long as the output of the timer 83 is low-level, the transistors 91 and 92 are both turned off and a prohibition suspending signal is thereby outputted to the gate of the first switching device 20. As a result, this first switching device 20 is free from ON prohibition for as long as the output of the timer 83 is low-level.

Accordingly, on the basis of this suspension of prohibition, the first driving circuit 100 turns on the first switching device 20. As a result, the first through third switching devices 20 through 40 all become ON, and the d.c. power supply passes an activating current from its positive side terminal +B through the first and second switching devices 20 and 30, the squib 10 and the third switching device 40. Consequently, the squib 10 fires and operates the air-bag device A.

Here, because the ON state of the first switching device 20 is maintained for a predetermined timing period, which is the period over which the timer 83 produces a low-level timer output, as described above, firing of the squib 10 can be ensured irrespective of the operation of the mechanical switch 61 of the second acceleration sensor 60. As a result, the system can even be used for two-stage inflation control of an air-bag of an air-bag device A requiring delay control.

After the processing of step 224 finishes as described above, in step 240, if the output of the second acceleration sensor 60 is the output voltage Vc, it is determined that the car is not in a collision and OFF processing for the first switching device 20 is carried out in step 242. The microcomputer 70 produces a low-level output signal from its output port 73. On the basis of the low-level output signal from the output port 73 of the microcomputer 70, the first driving circuit 100 turns off the transistor 101 to turn off the first switching device 20.

The output of the second acceleration sensor 60 is also inputted to the timer circuit 80. Here, if the output of the second acceleration sensor 60 is the output voltage Vc, the comparator 81 produces a high-level comparison signal. Consequently, the timer 83 maintains a high-level output. Accordingly, in the prohibiting circuit 90, the transistor 91 receives the high-level output signal from the timer 83 at its base via the resistors 93, 94 and becomes ON and thereby turns on the transistor 92 by way of the resistors 95, 96. As a result, a circuit comprising the resistors 105 and 97 in parallel is connected between the gate and the source of the first switching device 20.

Here, because as mentioned above the resistor value of the resistor 97 is amply small compared to the resistor value of the resistor 105 and is close to 0 Ω, the impedance between the gate and the source of the first switching device 20 is generally equal to the resistor value of the resistor 97. As a result, because the gate and the source of the first switching device 20 are in a substantially shorted state, ON operation of the first switching device 20 is prohibited and the above-mentioned OFF state can be maintained.

In this case, as mentioned above, even if a leak resistor RL arises between the gate of the first switching device 20 and ground, this leak resistor RL is extremely large compared to the above-mentioned impedance and hence compared to the resistor value of the resistor 97. Therefore, when the prohibiting circuit 90 is prohibiting ON operation of the first switching device 20, even if a leak resistor RL arises, ON operation of the first switching device 20 is prohibited and its OFF state is maintained without fail. As a result, the air-bag device A does not operate erroneously due to the first switching device 20 being caused to turn on erroneously by a leak resistor RL resulting from dewing or wetting.

Further, the timer circuit 80 and the prohibiting circuit 90 are provided independently of the output ports of the microcomputer 70. Therefore, even if the microcomputer 70 operates erroneously or there is an erroneous output from its output ports 73 through 75 or electrical noise is produced, erroneous ON operation of the first switching device 20 can be certainly avoided. Thus, it is possible to prevent an activating current from erroneously flowing through the squib 10.

Also, in this first preferred embodiment, the timer circuit 80 is connected to the prohibiting circuit 90 and the microcomputer 70 is connected to the first driving circuit 100. Consequently, while the ON prohibition of the first switching device 20 is being suspended by the prohibiting circuit 90, the above-mentioned effects can be achieved with the ON timing and the ON holding time of the first switching device 20 being controlled finely by the microcomputer 70 by way of the first driving circuit 100.

Figure 3:
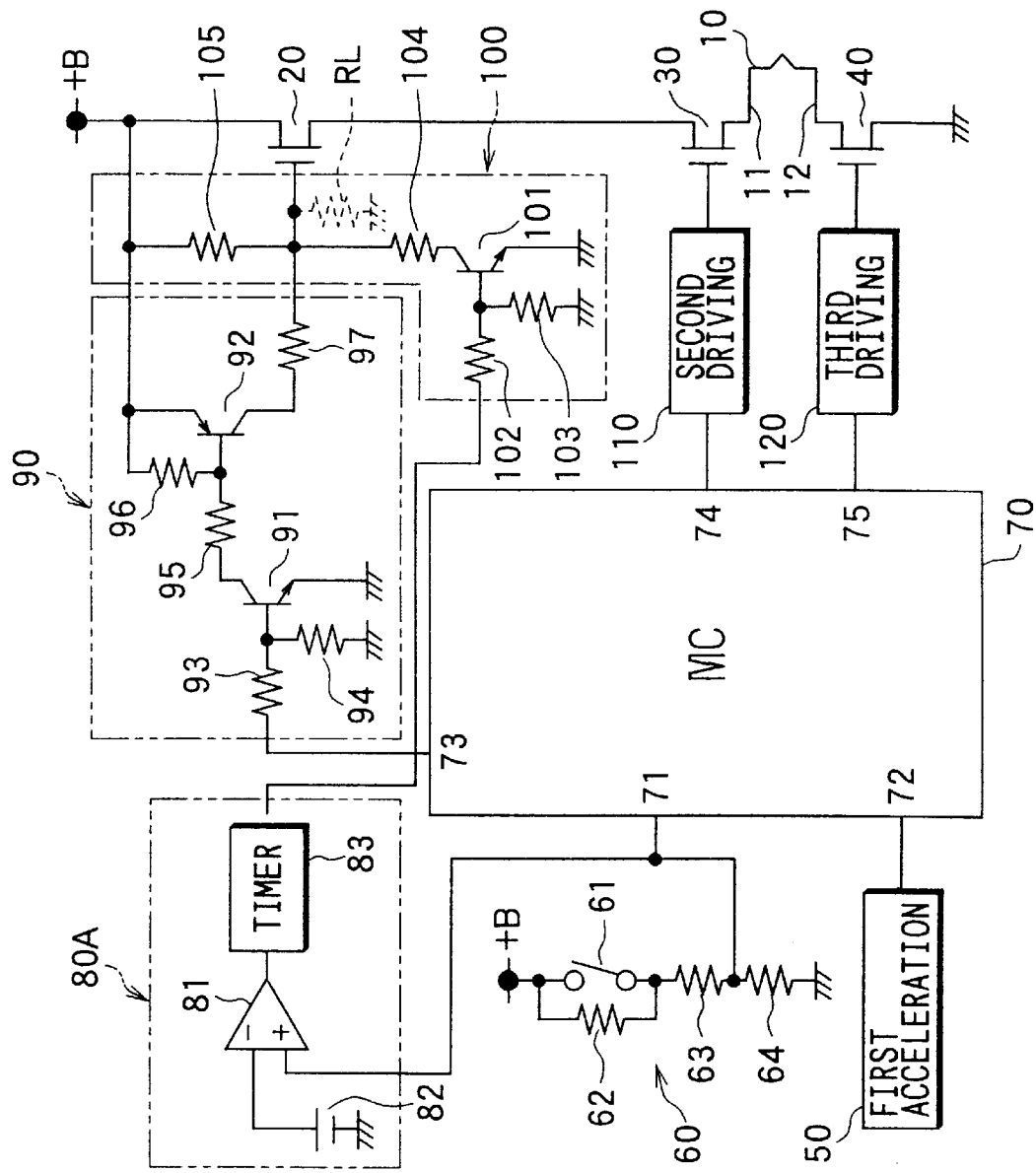
FIG. 3 is an electronic circuit diagram showing a variation of the first preferred embodiment.

FIG. 3 shows a variation of the first preferred embodiment described above. In this variation, a timer circuit 80A is employed instead of the timer circuit 80 in the first preferred embodiment. Here, the timer circuit 80A has a construction like that of the timer circuit 80 except that the reference voltage circuit 82 is connected to the inverting input terminal of the comparator 81 and the non-inverting input terminal of the comparator 81 is connected to the output terminal of the second acceleration sensor 60. As a result, when the output of the second acceleration sensor 60 is the output voltage Va, the comparator 81 produces a high-level comparison signal and when the output of the second acceleration sensor 60 is the output voltage Vc the comparator 81 produces a low-level signal.

Unlike in the first preferred embodiment described above, the timer 83 of the timer circuit 80 has its output terminal connected by way of the resistor 102 of the first driving circuit 100 to the base of the transistor 101. The microcomputer 70 has its output port 73 connected through the resistor 93 to the base of the transistor 91 of the prohibiting circuit 90.

Here, differently from in the case of the first preferred embodiment described above, the timer 83 produces a high-level output to thereby turn on the transistor 101 on the basis of a high-level comparison signal from the comparator 81. The timer 83 produces a low-level output and thereby turns off the transistor 101 on the basis of a low-level comparison signal from the comparator 81.

This timer 83 functions as a high-level output holding timer which activates timing when a high-level comparison signal is outputted from the comparator 81 and simultaneously outputs a high-level timer signal. The the holding period for the timer signal of this high-level output holding timer is set to, for example, 10 ms.

That is, the timer circuit 80A turns on the transistor 101 of the first driving circuit 100 for a period of at least 10 ms when the "acceleration detection" voltage Va is outputted from the second acceleration sensor 60. The rest of the construction of this variation of the first preferred embodiment is the same as the first preferred embodiment described above.

With this variation, a command ordering the suspension of ON prohibition of the switching device 20 is issued to the prohibiting circuit 90 in step 241 of the flow chart of FIG. 2, and a command ordering ON prohibition of the first switching device 20 is issued to the prohibiting circuit 90 in step 242. In this way it is possible to achieve essentially the same effects as those of the first preferred embodiment.

Second Preferred Embodiment

FIG. 4 shows a second preferred embodiment of the invention. In this second preferred embodiment, a second acceleration sensor 60A has its output terminal connected to the input port 71 of the microcomputer 70 in place of the second acceleration sensor 60 of the first embodiment. This second acceleration sensor 60A is an electronic acceleration sensor and has the same function as the first acceleration sensor 50.

In this second preferred embodiment, the comparator 81 of the timer circuit 80 has its inverting input terminal connected to the output terminal of the second acceleration sensor 60A. As a result, the comparator 81 compares the level of the acceleration signal from the second acceleration sensor 60A with the reference voltage of the reference voltage circuit 82 and produces essentially the same comparison signal as in the first preferred embodiment.

In this second preferred embodiment, a prohibiting circuit 90A is employed in place of the prohibiting circuit 90. This prohibiting circuit 90A is connected between the timer circuit 80 and the third switching device 40.

The prohibiting circuit 90A has an NPN transistor 98 functioning as a fourth switching device. This transistor 98 has its base connected by way of a resistor 99a to the output terminal of the timer 83. Also, this transistor 98 has its collector connected to the gate of the third switching device 40. A resistor 99b is connected between the base of the transistor 98 and ground.

In this prohibiting circuit 90A, the transistor 98 receives the timer signal from the timer 83 and operates in the same way as the transistor 91 of the first preferred embodiment, suspending ON prohibition of the third switching device 40 in the same way as ON prohibition of the first switching device 20 is suspended in the first preferred embodiment. Also, the transistor 98 stays ON and prohibits ON operation of the third switching device 40 on the basis of the high-level output of the timer 83. The rest of the construction of this second preferred embodiment is essentially the same as in the first preferred embodiment described above.

With this second preferred embodiment, instead of the first switching device 20, the third switching device 40 has its ON operation prohibited and that prohibition suspended by the prohibiting circuit 90A replacing the prohibiting circuit 90 described in the first preferred embodiment. Consequently, for example even if the first switching device 20 is caused to turn on by a leak resistor RL of the kind discussed in the first preferred embodiment, ON operation of the third switching device 40 is prohibited by the prohibiting circuit 90A. As a result, as in the first preferred embodiment, even if a leak resistor arises due to dewing or wetting, it is possible to prevent without fail a current from erroneously flowing through the squib 10. Other actions and effects of this second preferred embodiment are the same as those of the first preferred embodiment. In this second preferred embodiment, the resistor 99c shown in FIG. 4 may be dispensed with.

In implementing this invention, a short-circuit failure to the car end of the connection line (squib line) of the squib 10 may be either short-to-power or short-to-ground. However, as the car chassis itself is grounded to the negative side terminal of the d.c. power supply, the car end of the squib line is often made a grounded part. Therefore, a short-to-ground is the more likely to occur.

Therefore, to make the air-bag device A unlikely to operate erroneously, it is preferable for a highly reliable switching device such as a safety switch to be on the upstream side of the squib. This is because if the reliability of a switching device on the upstream side of the squib is low and an erroneous operation of that overlaps with a short-to-ground of the negative side terminal of the squib, an activating current will flow through the squib.

From this point of view, when as in the preferred embodiments described above there are three switching devices, first through third switching devices 20 through 40, it is preferable for two of them to be connected to the upstream side of the squib 10 and one of them to be connected to the downstream side, so that there are a plurality of switching devices on the upstream side of the squib 10. In the preferred embodiments described above, because the first and second switching devices 20 and 30 are connected to the upstream side of the squib 10 (positive side terminal +B side of the d.c. power supply), even if there occurs an overlap of an erroneous operation of a switching device on the upstream side with a short-to-ground of the negative side terminal of the squib, the possibility of an activating current flowing through the squib is much reduced.

In implementing this invention, the first switching device 20 may alternatively be a PNP type transistor, and the fourth switching device may alternatively be a P-channel field effect transistor. The first and second acceleration sensors may be provided in a single control unit. And the output of each of the acceleration sensors may be an encoded serial signal.

Also, to improve resistor to leaks, the prohibiting circuit and the first driving circuit may be built into an integrated IC package. The benefit of this is that circuits inside an IC package generally are not readily affected by dewing or wetting outside the IC.

When the microcomputer 70 outputs an encoded serial signal to the second driving circuit 110 and the second driving circuit 110 turns on the second switching device 30 when this serial signal matches a predetermined code, a decoder circuit may be used as the second driving circuit 110.

When the third switching device 40 is turned on or off on the basis of a high-level or low-level output from the microcomputer 70, the third driving circuit 120 may comprise an interconnection directly connecting the output port 75 of the microcomputer 70 and the gate of the third switching device 40. When the microcomputer 70 outputs an encoded serial signal to the third driving circuit 120 and the third driving circuit 120 turns on the third switching device 40 when this serial signal matches a predetermined code, a decoder circuit may be used as the third driving circuit 120.

The present invention is not limited to application to an activating device of an air-bag device in an air-bag system for a car, and can also be applied to an activating device in a passenger protection system such as a seat belt pretensioner for a car or to activating devices of passenger protection systems for use in vehicles generally.

What is claimed is:

1. An activating device for a passenger protection device of a passenger protection system in a vehicle, comprising:

a squib for activating the passenger protection device when an activating current is supplied;

first through third electronic switching devices, connected in series with the squib between a positive side terminal and a negative side terminal of a power supply, for allowing the activating current to pass through the squib from the power supply when turned on;

first and second acceleration sensors for detecting an acceleration of the vehicle;

first determining means for determining whether the vehicle is in a collision on the basis of detection outputs of the first and second acceleration sensors;

second determining means for determining whether the vehicle is in the collision on the basis of the detection output of the second acceleration sensor;

driving means for turning on the first through third electronic switching devices when it is determined by the first determining means that the vehicle is in the collision; and ON-prohibiting means for prohibiting one of the first through third electronic switching devices from being switched on by the driving means when it is determined by the second determining means that the vehicle is not in the collision and suspending this prohibition when it is determined by the second determining means that the vehicle is in the collision, wherein the first determining means is a microcomputer comprising a hardware unit independent from the second determining means.

2. The activating device as in claim 1, wherein:

the switching device which has its ON operation prohibition-controlled by the ON-prohibiting means is the first electronic switching device; and the first electronic switching device is either a PNP transistor or a P-channel field effect transistor connected nearer to the positive terminal side of the power supply than the squib.

3. The activating device as in claim 2, wherein:

the first electronic switching device, the second electronic switching device, the squib and the third electronic switching device are connected in series in this order from the positive side to the negative side terminals of the power supply.

4. The activating device as in claim 3, wherein:

the ON-prohibiting means is a PNP transistor constituting a fourth electronic switching device for prohibiting the first electronic switching device from being turned on by its respective driving means; and the PNP transistor has its collector connected to a control terminal of the first electronic switching device by way of a low-impedance device.

5. The activating device as in claim 3, wherein:

the ON-prohibiting means is a P-channel field effect transistor constituting a fourth electronic switching device for prohibiting the first electronic switching device from being turned on by its respective driving means; and the field effect transistor has its drain connected to the control terminal of the first electronic switching device by way of a low-impedance device.

6. The activating device as in claim 4, wherein:

the impedance of the low-impedance device is set to a value within a range such that ON operation of the first electronic switching device can be prohibited by ON operation of the fourth electronic switching device even when a leak resistor of 1 k$\Omega$ or more arises between the control terminal of the first electronic switching device and ground.

7. An activating device for a passenger protection device of a passenger protection system in a vehicle, comprising:

a squib for activating the passenger protection device when an activating current is supplied;

first through third electronic switching devices, connected in series with the squib between a positive side terminal and a negative side terminal of a power supply, for allowing the activating current to pass through the squib from the power supply when turned on;

first and second acceleration sensors for detecting an acceleration of the vehicle;

first determining means for determining whether the vehicle is in a collision on the basis of detection outputs of the first and second acceleration sensors;

second determining means for determining whether the vehicle is in the collision on the basis of the detection output of the second acceleration sensor;

driving means for turning on one of the first through third electronic switching devices when it is determined by the second determining means that the vehicle is the collision;

ON-prohibiting means for prohibiting said one of the first through third electronic switching devices from being switched on by the driving means when it is determined by the first determining means that the vehicle is not in the collision and suspending this prohibition when it is determined by the first determining means that the vehicle is in the collision; and further driving means, provided as additional driving means separate from said driving means, for turning on the remaining electronic switching devices when it is determined by the first determining means that the vehicle is in the collision, wherein the first determining means is a microcomputer comprising a hardware unit independent from the second determining means.

8. The activating device as in claim 7, wherein:

the switching device which has its ON operation prohibition-controlled by the ON-prohibiting means is the first electronic switching device; and the first electronic switching device is either a PNP transistor or a P-channel field effect transistor connected nearer to the positive terminal side of the power supply than the squib.

9. The activating device as in claim 8, wherein:

the first electronic switching device, the second electronic switching device, the squib and the third electronic switching device are connected in series in this order from the positive side terminal to the negative side terminal of the power supply.

10. The activating device as in claim 9, wherein:

the ON-prohibiting means is a PNP transistor constituting a fourth electronic switching device for prohibiting the first electronic switching device from being turned on by its respective driving means; and the PNP transistor has its collector connected to a control terminal of the first electronic switching device by way of a low-impedance device.

11. The activating device as in claim 9, wherein:

the ON-prohibiting means is a P-channel field effect transistor constituting a fourth electronic switching device for prohibiting the first electronic switching device from being turned on by its respective driving means; and the field effect transistor has its drain connected to the control terminal of the first electronic switching device by way of a low-impedance device.

12. The activating device as in claim 11, wherein:

the impedance of the low-impedance device is set to a value within a range such that ON operation of the first electronic switching device can be prohibited by ON operation of the fourth electronic switching device even when a leak resistor of 1 kΩ or more arises between the control terminal of the first electronic switching device and ground.

13. An activating device for a passenger protection device of a passenger protection system in a vehicle, comprising:

a squib for activating the passenger protection device when an activating current is supplied;

a plurality of electronic switching devices, connected in series with the squib, for allowing the activating current to pass through the squib when turned on;

first and second acceleration sensors for detecting an acceleration of the vehicle;

first circuit for determining whether the vehicle is in a collision on the basis of detection outputs of the first and second acceleration sensors;

second circuit for determining whether the vehicle is in the collision on the basis of the detection output of the second acceleration sensor; and ON-prohibiting circuit for prohibiting one of the electronic switching devices from being switched on when it is determined by one of the first and the second circuits that the vehicle is not in the collision and suspending this prohibition when it is determined by the one of the first and the second circuits that the vehicle is in the collision, wherein one of the first circuit and the second circuit is a microcomputer provided as a hardware unit separately from the other of the first circuit and the second circuit.

* * * * *